United States Patent [19]
Kabel

[11] Patent Number: 5,936,553
[45] Date of Patent: Aug. 10, 1999

[54] NAVIGATION DEVICE AND METHOD FOR DISPLAYING NAVIGATION INFORMATION IN A VISUAL PERSPECTIVE VIEW

[75] Inventor: Darrin W. Kabel, Olathe, Kans.

[73] Assignee: Garmin Corporation, Taiwan

[21] Appl. No.: 08/810,630

[22] Filed: Feb. 28, 1997

[51] Int. Cl.[6] .................................................. G08G 1/123
[52] U.S. Cl. .................... 340/995; 340/990; 701/208; 701/211
[58] Field of Search .................... 340/990, 995, 340/988; 701/208, 211

[56] References Cited

U.S. PATENT DOCUMENTS

| | | | |
|---|---|---|---|
| 5,115,398 | 5/1992 | DeJong | 340/995 |
| 5,161,886 | 11/1992 | DeJong et al. | 340/995 |
| 5,200,902 | 4/1993 | Pilley | 340/995 |
| 5,204,817 | 4/1993 | Yoshida | 364/449 |
| 5,225,842 | 7/1993 | Brown et al. | 342/357 |
| 5,297,051 | 3/1994 | Arakawa et al. | 364/449 |
| 5,323,164 | 6/1994 | Endo | 342/357 |
| 5,396,431 | 3/1995 | Shimizu et al. | 340/995 |
| 5,434,789 | 7/1995 | Fraker et al. | 364/460 |
| 5,471,205 | 11/1995 | Izawa | 340/995 |
| 5,613,055 | 3/1997 | Shimoura et al. | 340/995 |
| 5,732,385 | 3/1998 | Nakayama et al. | 340/995 |

*Primary Examiner*—Brent A. Swarthout
*Attorney, Agent, or Firm*—Shook, Hardy & Bacon L.L.P.

[57] ABSTRACT

An electronic navigation device and method, for displaying a visual representation of navigational information in a selected perspective view, includes a processor, a display, a key pad input, a memory, and an antenna. Navigational information, such as way-points in an active route, hazards and landmarks, and the position, direction, and speed of movement of the navigational device, are entered into the processor. The processor determines a trapezoidally-shaped visible region based upon user inputs, clips the navigational information to the visible region, and transforms the navigational information within the visible region to a selected perspective viewing plane. Polygons, representative of highway lanes, are displayed on the display, in the desired perspective view, for each route leg of a route within the visible region. Intersecting route legs, oriented at different angles relative to each other, have rounded ends so as to precisely overlap and illustrate a curve in the "highway lanes" at a turn event way-point. The device and method provide for an at least substantially true perspective view of navigational information, which is updated in real time.

2 Claims, 4 Drawing Sheets

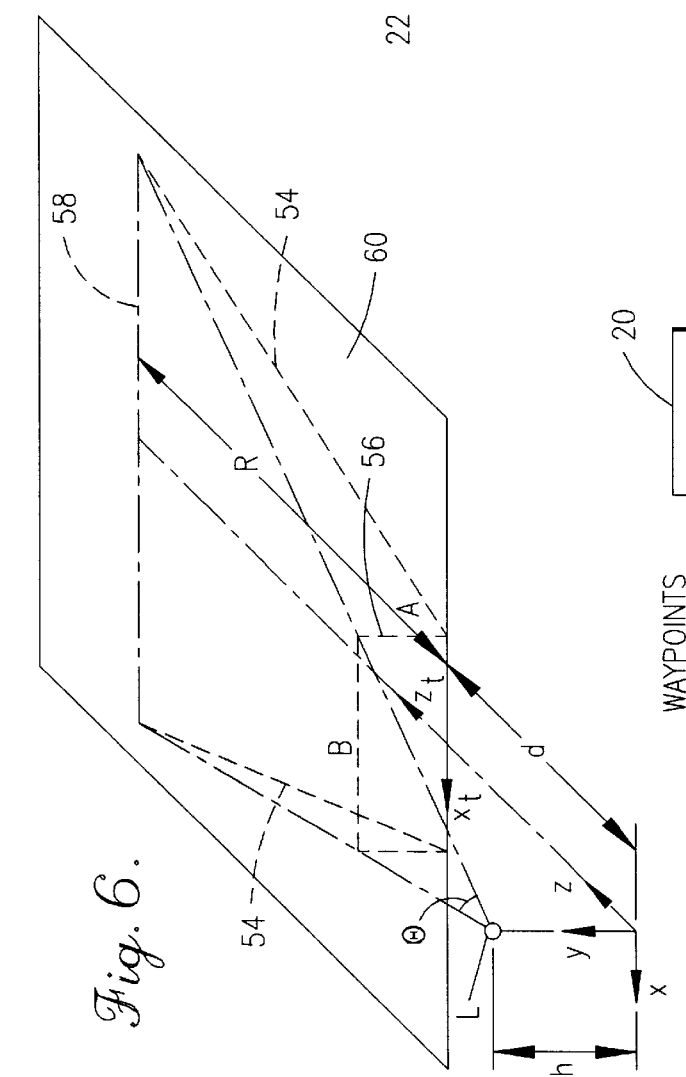
Fig. 6.
Fig. 7.
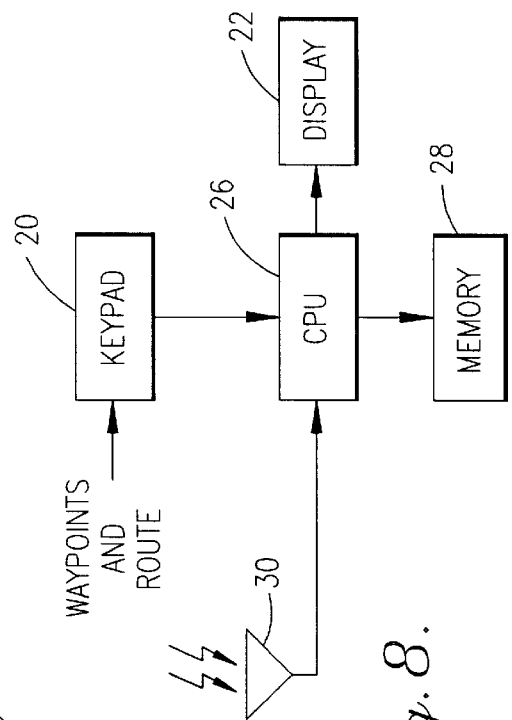
Fig. 8.

NAVIGATION DEVICE AND METHOD FOR DISPLAYING NAVIGATION INFORMATION IN A VISUAL PERSPECTIVE VIEW

BACKGROUND OF THE INVENTION

1. Field of the Invention

The present invention is generally directed to an electronic navigation device employing a receiver for receiving GPS satellite signals. More particularly, the present invention is directed to an electronic navigation device and method for displaying a navigation route in a perspective view on a display screen of the device.

2. Description of the Related Art

Electronic navigation devices employing GPS receivers have become increasingly popular in recent years. The devices utilize an electronic satellite navigation system which permits a user of the system to determine his or her position with respect to the earth. Such navigation devices are extremely useful in navigation vehicles of all types, including aircraft, marine craft, and land vehicles. Additionally, the devices are useful for tracking purposes, and hand held versions are popular with hikers and campers.

Very generally, conventional electronic navigation devices employ a receiver which detects signals from a number of satellites orbiting the earth. A processor within the navigation device computes the location of the device, based upon data received from the received satellite signals, after a sufficient number of GPS satellite signals have been acquired. Particularly, once a sufficient number of GPS satellite signals are acquired, the device is able to calculate its position with respect to the various satellites. Thus, an electronic navigation device employing a GPS receiver has the ability to accurately compute the position of the device on or near the earth in real time, even as the device moves, in addition to being able to calculate the velocity and direction at which the device is moving in three dimensions.

U.S. Pat. No. 5,323,164 to Endo teaches a satellite radio wave capturing method for a global positioning system receiver. U.S. Pat. No. 5,225,842 to Brown, et al. teaches a vehicle tracking system employing global positioning system satellites. Each of these patents is incorporated herein by reference.

Both recreational and professional users of navigation equipment seek intuitive representations of navigation information which are direct and simple to interpret. The ability of a navigation device to present navigation information in a manner that is simple to interpret is particularly important to professional users, who use the equipment as one basis for navigating a vessel, such as an aircraft or marine craft.

Many conventional navigation devices use what is commonly referred to as a "highway" representation, where an intended navigational course or route is presented on a display screen as a line drawn to a horizon, with borders creating a lane which all converge at a vanishing point on the horizon. By orienting this image of the intended path of navigation with the user's or vessel's orientation, an intuitive steering guide results for keeping a navigator on course. While the interpretation of such a navigational aid is indeed intuitive and helpful, it falls short of achieving the ultimate goal of displaying all navigation information in a true perspective, or in a virtual presentation, where spacial relationships between the navigator and various points of interest, such as turn events or hazards, are correct, even for navigational routes which consist of multiple legs at varying angles to each other.

Another prior art method of displaying navigational information draws a single lane, indicative of an active route leg, on the display screen. The leg doesn't truly converge to any vanishing point. Rather, the lane rotates, depending upon the navigator's relationship to the intended path of navigation indicated by the lane. A primary drawback of this prior art approach is that, when the navigator gets off course, for instance when the navigator is oriented sidewise relative to the course, the device is unable to display anything meaningful. This problematic prior art approach is illustrated in FIGS. 2b and 2c, and described in greater detail below.

An additional prior art approach is to show multiple legs of a route from a top-down view on a display screen of the navigation device. While such an approach provides the navigator with situational awareness, it does not provide the navigator with a true visual perspective, similar to what the navigator would see looking from the navigator's position in the vessel being navigated.

Accordingly, the need exists for an electronic navigational device which provides intuitive presentations of navigation information which are direct and simple to interpret. Particularly, the need exists for a navigational device which displays a presentation of a navigational route in a visual perspective view which is at least substantially true to the relationship of actual positions on or near earth. Specifically, the need exists for an electronic navigational device which displays navigation data in a virtual reality format, wherein the navigation data displayed on the display is presented from a selected perspective location. More specifically, the need exists for a navigation device which displays, on a display screen, a navigation route and way point information similar to a real world perspective view from the navigator's actual location, even where the navigational information displayed includes multiple legs of a route positioned at various angles with respect to each other. The present invention fills these and other needs, including the need to reduce the mental interpretation required by a navigator when viewing a navigation device, while overcoming the drawbacks of the prior art, with a simple solution and implementation of that solution in the device an method disclosed herein.

SUMMARY OF THE INVENTION

It is an object of the present invention to display a visual presentation of navigation information in a perspective view.

It is an object of the present invention to display a visual presentation of navigation information from a selected perspective location.

It is another object of the present invention to transform navigational data, representative of a top down view of a map, including navigation information, to navigational data representative of a perspective view of the same map.

It is an additional object of the present invention to simultaneously display multiple legs of a navigational view from a selected perspective location.

It is an additional object of the present invention to simplify the mental interpretation required by a navigator utilizing a navigation device.

These and other objects are achieved by a unique electronic navigation device, and method, for displaying navigation information in a selected perspective view on a display screen. The device includes a housing for housing a processor and a key pad input unit, a memory, a display having a display screen, and an antenna, all connected to the processor. The navigational device is operable to acquire satellite signals from global positioning satellites, to enable computation of geographic and altitude location of the device in a conventional manner. The navigational device of the present invention may be incorporated in a portable, hand-held unit, or may be incorporated in a mounted unit for use in a vehicle or vessel, such as an automobile, truck, airplane or boat.

In operation, navigational information is entered into the memory of the navigation device. Particularly, the position of the navigation device is determined by the GPS functions. Additionally, if the device is in motion, the direction and velocity of movement are also determined in a conventional manner. Way points, such as hazards or landmarks, turn events in a route, or other points of interest are entered, by a navigator in a conventional manner, using the key pad. Next, the navigator utilizing the navigational device defines an active navigation route, in a known manner, utilizing the key pad. Data indicative of the navigational information is stored in memory, as if viewed from the top down.

Once all navigational inputs have been entered, the navigation device of the present invention determines a trapezoidally shaped visible region corresponding to inputs selected by the user. In accordance with the principles of the invention, all of that area behind the navigator is clipped from the visible region. Next, a horizon is determined based upon a setting by the user. Particularly, the navigation device of the present invention displays, on the display screen, an indication of the user's peripheral vision. The operator has the ability to select his or her peripheral vision, within a defined range, and a horizon corresponding to the selected peripheral vision is established.

Once the visible region is determined, the processor of the present invention clips the navigational information, including any portion of the active navigational route or other landmarks, to the trapezoidally-shaped visible region. The processor then transforms data indicative of a top down view of a map into a perspective view, from a selected perspective location. The transformation process is carried out by transforming data indicative of the navigational information, within the viewing region, to a perspective plane, or window. Particularly, in accordance with the invention, the transformation is translated in origin to the perspective viewing plane. Where the navigational information includes route legs, the processor creates and draws lane polygons corresponding to each leg of the route within the visible region. Once all of the lane polygons within the visible region are drawn, a center line for each lane is drawn on the display screen, and then the entire process is repeated for any other way-points or landmarks within the visible region. Particularly, any way-points which would be visible in a top down view of the map are transformed by the processor to the selected perspective view, and translated to the perspective viewing plane or window, and a way-point marker is drawn. The display screen thereby presents a perspective view of one or more lanes, indicative of legs of a route, and other markers denoting hazards or landmarks within the defined visible region. The display is periodically updated to accommodate a moving individual or vessel.

BRIEF DESCRIPTION OF THE DRAWINGS

The objects and features of the invention noted above are explained in more detail with reference to the drawings, in which like reference numerals denote like elements, and in which:

FIG. 6 illustrates the manner in which the visible region is transformed to a perspective viewing plane, or window;

FIG. 7 is a front elevational view of a navigational device of the present invention;

FIG. 8 is a block diagram of the electrical circuitry of the navigational device of the present invention;

DETAILED DESCRIPTION OF THE INVENTION

Figure 1:
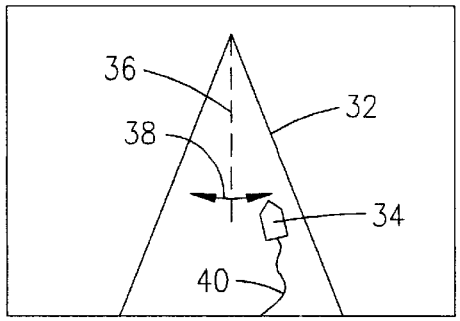
FIGS. 1, 2a, 2b, and 2c illustrate prior art representations of course legs on display screens on conventional navigational devices.

With reference initially to FIG. 7, a navigation device of the present invention is designated generally by reference numeral 10. As illustrated, navigation device 10 has a housing 12 positioned on a base 14 for mounting, by mounting member 16, to a surface. Navigation device 10 has a front face 18, including an input area comprised of a key pad, designated generally by reference numeral 20, and a display, designated generally by reference numeral 22, having a display screen 23. Input area 20 comprises a key pad formed of keys 24. It should be understood that the structure of navigation device 10 is shown as illustrative of one type of navigation device. Other physical structures, such as a portable hand-held unit, are contemplated and within the scope of this invention.

As illustrated in the block diagram of FIG. 8, navigation device 10 of the present invention includes a processor, designated by central processing unit (CPU) 26. Key pad 20 and display 22, as well as memory 28 and an antenna 30, are connected to processor 26, as shown. In accordance with the principles of the present invention, and as described in detail below, display 22 displays navigation information, such as a navigational route and landmark or hazard information, in a perspective view in real time during operation of navigation device 10.

With reference now to FIGS. 1 and 2, prior art navigation device displays are shown and described.

With reference to FIG. 1, a conventional prior art approach for displaying navigational information in a navigation device is illustrated. In such a device, a processor processes navigational data to display a lane, such as lane 32, which represents a leg of a route. The lane converges to a vanishing point on the horizon. Lane 32 is fixed in time and space. An icon 34, indicative of a boat in this example, is positioned on the lane. The path that the navigator intends to follow is represented by the center line 36, located down the middle of the vanishing lane 32. By way of an example, assuming that the navigation device is employed on a marine craft, as the navigator of the craft departs from the desired path of navigation, the displayed icon 34 will correspondingly move within lane 32 in the direction of one of the arrows 38. Some prior art devices include a visual representation of a trail, as designated by reference numeral 40, to provide the operator with an indication of the actual path of the vessel or craft.

The prior art approach represented in FIG. 1 has numerous drawbacks. A primary drawback is that the display represents a static image, with the exception of side-to-side movement of the icon 34. Additionally, the display of FIG.

1 is incapable of adequately presenting an upcoming turn event in a navigational route. In short, the approach represented in FIG. 1, while providing the navigator with some indication of a course and movement with respect to that course, is incapable of displaying other useful information and requires the navigator to mentally interpret what is presented on the display.

Figure 2A:
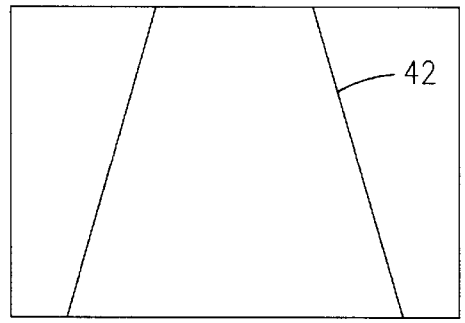
Figure 2B:
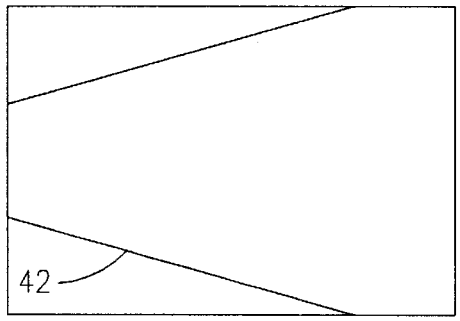

With reference to FIG. 2a, another prior art navigation device display is illustrated. In such a presentation, lane 42 does not truly converge to a vanishing point within the display area. Rather, lane 42 rotates, depending upon the vessel's relationship to the lane 42. One primary problem with this approach is illustrated in FIG. 2b. If a navigator controls a craft so that it moves sideways relative to the desired navigational path represented by lane 42, the display of the navigation device appears like that which is presented in FIG. 2b, which significantly differs from the way an actual highway lane would appear when travelling traverse to it. Thus, the approach in FIG. 2 is problematic when the navigator navigates off course.

Figure 2C:
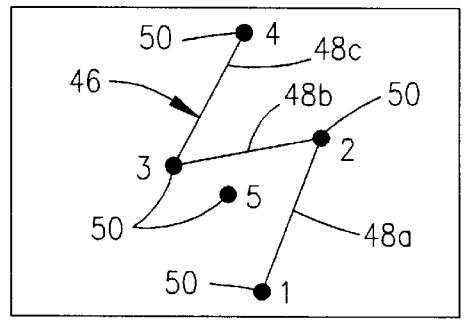

FIG. 2c illustrates yet another prior art approach to displaying navigational route information. As illustrated in FIG. 2c, which presents a top down view of a map containing a route 46, each leg 48 of route 46, as well as key way-points 50, such as starting and ending points, and turn events, are illustrated. While such an approach provides the navigator with situational awareness, particularly by illustrating a subsequent leg of a route before the craft or vessel actually arrives at the turn event location to begin navigation of the subsequent route, the approach illustrated in FIG. 2c still requires a significant amount of mental interpretation by the navigator, and does not provide the navigator with a true perspective view of the navigation information on the display.

With reference now to FIGS. 3–10, operation of the present invention is described in detail.

In operation, and with reference initially to FIGS. 7 and 8, a navigator inputs navigation information into processor 26 utilizing key pad 20. For example, assume that the navigator desires to route a course such as that illustrated in FIG. 2c, utilizing key pad 20, the navigator inputs data corresponding to way-points 50, which way-points include turn events and other navigation information, such as points of interest, hazard locations, or landmarks. Once the foregoing information is entered, the navigator selects a desired active route between the way-points utilizing key pad 20. In other words, the navigator enters the proper sequence of way-points to define a desired active course, or route, of navigation. Additionally, upon activation of navigation device 10, processor 26 begins its search for spread spectrum satellite signals from global positioning satellites. Upon acquisition of a sufficient number of satellites to calculate the location of navigation device 10, processor 26 computes (by triangulation) in a known manner, the location of navigation device 10, and the direction and velocity of movement of device 10, if appropriate. Based upon the inputs entered into processor 26, such as boat position via GPS functions, turn event positions, hazards, or landmarks, and the direction and speed of the vessel, when an active route has been established, processor 26 generates data indicative of a top-down view of a map, including the active route, and stores the data in memory 28.

Figure 9:
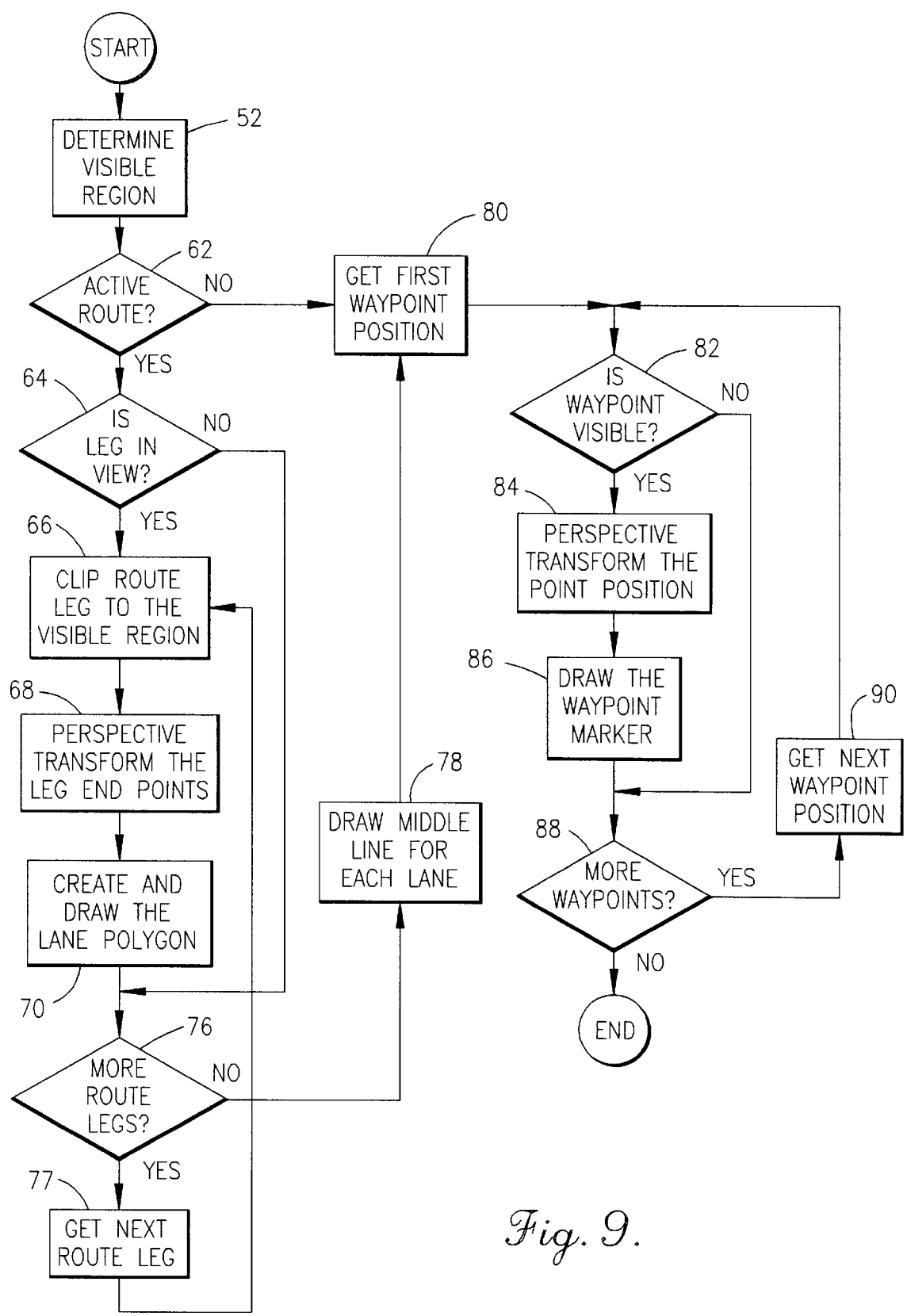
FIG. 9 is a flow chart illustrating the method and processing steps of the present invention.

With reference now to the flow chart of FIG. 9, once all navigational information has been input into navigation device 10, navigation device 10 starts to process steps for displaying a visual representation of the navigation data in a desired perspective view. At step 52 of FIG. 9, processor 26 determines a visible region. The visible region is that region, representative of what the navigator would see from his or her vantage point. The visible region is determined by establishing boundaries of that which is visible, based upon user selections at key pad 20.

Particularly, in accordance with the principles of the present invention, the user or navigator of navigation device 10 can select a peripheral vision setting using keypad 20. Preferably, quarter mile, half mile, one mile, two mile, and four mile peripheral vision settings are available on the navigation device 10. It will be understood, however, that other desired peripheral vision settings could be programmed into navigation device 10 for selection by the navigator. Each peripheral vision setting has a corresponding associated horizon distance. In accordance with the preferred principles of the present invention, a quarter mile peripheral vision setting establishes a horizon twelve (12) nautical miles away. A half mile peripheral vision setting establishes a horizon twenty-four (24) nautical miles away, and the remaining peripheral vision settings establish associated horizons at distances corresponding to the same ratio as those relationships described. Again, while the foregoing settings of navigation device 10 are preferred, other numerical data could be utilized.

With additional reference to FIG. 6, the step 52 of determining the visible region is more fully explained. As will be appreciated, the geometric representation of a perspective view is a trapezoid, such as the trapezoid 54 illustrated in FIG. 6. When establishing the boundaries for determining the visible region, processor 26 disregards everything behind a location corresponding to the vessel, represented in FIG. 6 as the location at a perspective window 56. As described in greater detail below, the perspective view developed by the present invention is from a selected perspective location, designated by point L on FIG. 6, translated to a viewing plane at perspective window 56. As seen, the selected perspective location is preferably above and behind the visible region. The angle θ of trapezoid 54 may be any selected angle, and is selected in accordance with the principles of the present invention, so as to provide an aesthetically pleasing and easy to interpret view on display screen 23 of navigation device 10. Specifically, the number of pixels used to represent the on screen image in accordance with the present invention never changes. Thus, the perspective window 56 always stays the same height and width (AB) on the unit screen 23, and the trapezoidal dimensions are fixed. However, the distances represented by the width and height of the window in the trapezoid change as the user selects a peripheral vision width.

Figure 3:
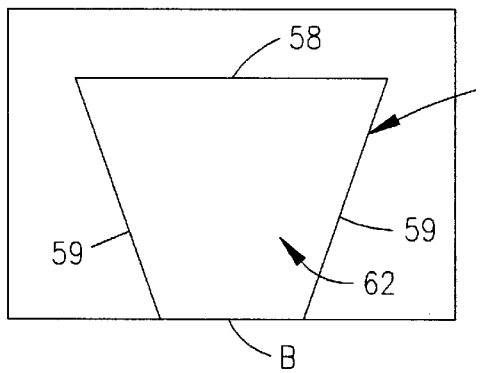
FIGS. 3–5 illustrate steps, accordingly to the principles of the present invention, of determining a visible region and clipping a leg of a route, within the visible region, to the visible region.

Thus, in a situation where the user selects a quarter mile peripheral vision width, width B of the perspective window is ¼ mile, and the horizon, designated by reference numeral 58, is a corresponding distance away. As described, in the preferred embodiment, a selection of ¼ mile peripheral vision width has a corresponding horizon distance of twelve (12) nautical miles for marine applications. In contrast, when a user selects a wider peripheral vision, such as four (4) miles, the distance B of perspective window 56 represents four (4) miles, and the horizon 58 is a much further corresponding distance away (e.g. 192 nautical miles). Thus, the determined visible region, is that area indicated by trapezoid 54. This is illustrated in FIG. 3, where the trapezoidal visible region is designated by reference numeral 62, having a base B of a distance corresponding to a selected peripheral vision, a horizon 58, and side boundaries 59.

Figure 4:
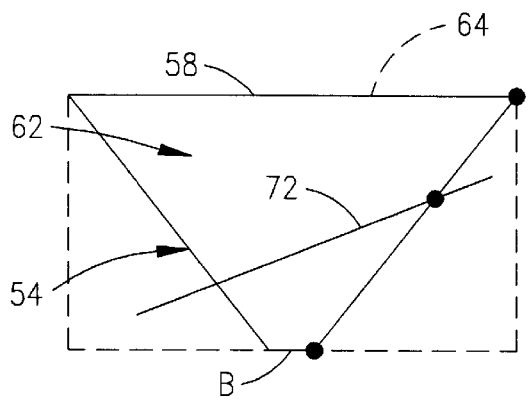

Thus, in accordance with the principles of the present invention, the trapezoidal region is defined in the pixel spaces of the display screen so as to be aesthetically pleasing and easy to interpret. Once its shape is established, a scaling and distance can be applied to the base of the trapezoid which will define the distance represented by the fixed number of pixels. As stated, this scaling is user selectable in that the user may select a desired peripheral vision. Then, utilizing the known position of the navigational device 10 (i.e., the vessel in which it is used), processor 26 utilizes simple mathematical scaling to compute the latitude/longitude positions of the corners of the trapezoid. From this computation, the smallest bounding rectangle, represented by reference numeral 64 in FIG. 4, is found.

With reference again to FIG. 9, once a visible region is determined at step 52, it is determined at step 62 whether an active route has been entered into navigation device 10. In the event that an active route has been entered into navigation device 10, processing steps proceed to step 64, wherein the processor determines whether a first leg of the active route is within the visible region.

As illustrated at step 64 in FIG. 9, when the first route leg is not within the visible region 62, steps 66, 68 and 70 are bypassed, and the process is repeated for any additional route legs. In the event, however, that it is determined at step 64 that the first route leg is within the visible region 62, step 66 is carried out by processor 26.

When it is determined at step 64 that the first leg of the active route is within the visible region 62, the processor clips the first route leg to the visible region at step 66. Particularly, at step 66, processor 26 clips a first leg of the route, such as the route for illustrative purposes illustrated in FIG. 2c, to the visible region. In the clipping process at step 66, the processor 26 starts by clipping to the bounding rectangle 64. This preliminary clipping step is performed computationally by processor 26 by positional comparison. Anything outside the bounding rectangle 64 is clipped and disregarded. This initial clipping step is advantageous because it speeds the entire clipping process. For instance, if a route leg does not cross bounding rectangle 64, it cannot cross the trapezoid 54, and hence will not be within the visible region 62. On the other hand, if a leg does cross the bounding rectangle, additional clipping computation is performed by processor 26 to determine if the leg crosses the trapezoid 54 and, hence, is viewable within visible region 62. This second stage of clipping is performed by processor 26, by converting positions along the leg in latitude/longitude coordinates to pixel coordinates, and then eliminating the pixel coordinates outside the trapezoid. The precise boundary of the trapezoid, and the intersection of the leg with the boundary of the trapezoid can be determined by simple geometric equations for a line, y=mx+b.

Once the first route leg has been clipped to the visible region, processing advances to step 68 of FIG. 9. At step 68, the end points of the leg of the route are computationally transformed by processor 26 to generate data indicative of a perspective view, from the desired perspective L (FIG. 6) of the route leg. Particularly, the data in memory indicative of a top down view of a map, including the route leg being transformed, is translated to the viewing plane of the perspective window 56, utilizing perspective transformation equations.

In accordance with an aspect of the present invention, known perspective transformation equations are modified to:

$$\text{Eq. 1:} \quad x_p = \frac{x_d}{z}$$

$$\text{Eq. 2:} \quad y_p = \frac{h(z-d)}{z}$$

where d is indicative of the selected peripheral vision, and h is selected to set the view elevation.

Particularly, the origin of the leg of the route being transformed is translated to the perspective viewing plane 56, utilizing the following modified equations:

$$\text{Eq. 3:} \quad x_p = \frac{x_t d}{z_t + d}$$

$$\text{Eq. 4:} \quad y_p = \frac{z_t h}{z_t + d}$$

Thus, it is seen that a fixed distance along a line from the viewing point L to the horizon is established by h and d.

The simplified transformation/translation equations 3 and 4, denoted above, permits processor 26 to perform computations in an extremely rapid manner, due to the simplicity of the equations. In such a manner, data indicative of points on map 60 (FIG. 6), represented by (x, z) coordinates, are transformed to perspective coordinates, represented by ($x_p$, $y_p$), utilizing the simplified transformation equations 1 and 2 set forth above. Particularly, and preferably, the perspective coordinates ($x_p$, $y_p$) are translated to the viewing plane 56, utilizing the modified translation transformation equations 3 and 4 set forth above.

Figure 5:
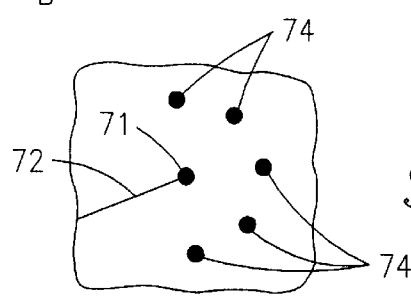

With additional reference to FIG. 5, a portion of a route leg with an end point 71, is designated generally by reference numeral 72. As part of the creation of a lane polygon to surround leg 72, processor 26 establishes a set of points 74 at a fixed distance in a circular arc around end point 71 of the leg 72. A similar set of points, in a circular arc, are generated around the opposite end of leg 72. At this point, it will be appreciated that, if a line were drawn connecting all of the points surrounding leg 72, the leg 72 would be completely enclosed with rounded ends. Once the circular arc of points is generated, processor 26 transforms each one of the points in the circular arcs to the perspective viewing plane by utilizing the modified translation transformation equation described above. As will be appreciated, any points on the circular arc falling outside the viewing region 62 remain clipped from the viewing region.

Once transformation for all of the points in the arcs have taken place, processor 26 creates and draws the lane polygon in a conventional drawing manner, as denoted by step 70 in FIG. 9. In this regard, once the lane polygon is created, it is displayed on display screen 23 by activating or deactivating, depending upon the type of display, the appropriate pixels of the display screen 23. Once the lane polygon is drawn in step 70, processor 26 determines, at step 76, whether there is another route leg in the active route. In the event there is another route leg, it is retrieved at step 77, and step 64 is repeated to determine if it is within the visible region 62. In the event the leg is within the visible region, data indicative of that route leg is retrieved from memory 28, and steps 66, 68 and 70 are repeated for the route leg.

As described above, each lane polygon is created and drawn, in accordance with an aspect of the present invention, with a rounded end. This is computationally advantageous because, when adjacent legs intercept each other and each has a rounded end, the rounded ends precisely overlay each other, providing a visual curve, or bend on display 22, regardless of the actual angle between adjacent route legs. Thus, in accordance with a preferred feature of the present invention, the actual angle of orientation between adjacent route legs is not used in determining overlapping lane polygons at turn events.

Once it is determined at step 76 that there are no more route legs (in the visible region), the processor draws a center line for each lane, as indicated at step 78. Thus, at step 78, the end points of the clipped legs are transformed and connected by a the center lines. At step 80, the first way-point position, such as a hazard or other landmark, is retrieved. As will be appreciated, any way-points outside the visible region were clipped from the visible region in step 64. Thus, if the processor 26 determines at step 82 that the way-point is outside the visible region, steps 84 and 86 are bypassed. However, when a way-point is within visible region 62, the processor transforms data indicative of that way-point to the perspective viewing window 56, again utilizing the modified translation transformation/translation equations 3 and 4:

$$\text{Eq. 3:} \quad x_p = \frac{x_t d}{z_t + d}$$

$$\text{Eq. 4:} \quad y_p = \frac{z_t h}{z_t + d}$$

Once the perspective transformation of step 84 has taken place, processor 26 draws a way-point marker on display screen 23, as indicated at step 86. Processor 26 determines at step 88 whether additional way-points have been entered into navigational device 10. In the event there are additional way-points, data indicative of the next way-point position is retrieved from memory 28, as indicated by step 90, and steps 82, and possibly 84 and 86, are repeated. When there are no more way-points to retrieve from memory 28, display 22, illustrating the visible region 62 in perspective, is completely drawn.

With reference now to FIG. 10, display screen 22 is illustrated in sequence as a navigator travels the route illustrated in FIG. 2c. As illustrated in FIG. 2c, a navigational route has been defined as starting at marker 1, and proceeding along a first leg of the route to marker 2, along a second leg of the route to marker 3, and along a third leg of the route to marker 4. A fifth marker is identified at another way-point, such as a hazard position, entered by the user.

Figure 10A:
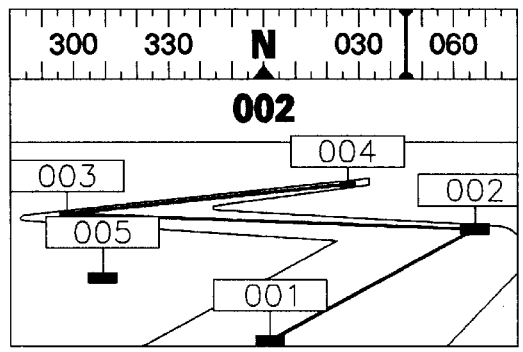
FIGS. 10a, 10b, and 10c illustrate the display screen of the navigation device of the present invention in operation.

As described above, data indicative of a top down view of the navigational route, such as that set forth in FIG. 2c, has been stored in memory 28, and then transformed to the perspective viewing plane, or window, 56. Illustrated in FIG. 10a is a representation of a perspective view of the desired route. As illustrated in FIG. 10a, the vessel is traveling due North and the path the vessel needs to follow to get from marker 1 to marker 4 crosses in front of the vessel. In this view, the entire navigational route is shown, along with marker 5, illustrating a significant point near the route in the field of view.

Figure 10B:
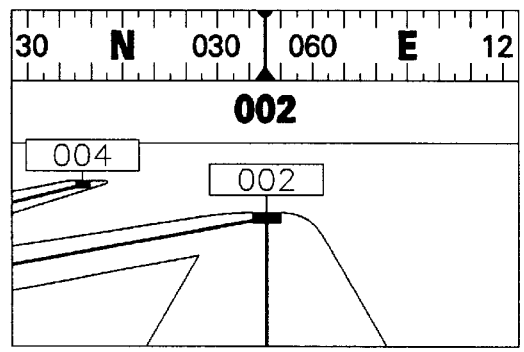

As illustrated in FIG. 10b, the vessel has begun to follow the path from marker 1 to marker 2, by turning to the Northeast. If the navigator of the vessel intends to stay on course, it is obvious from the display 22 that the line in the center of the lane should be vertical and centered in the middle of the display. As can be seen, the representation on display 22 is indicative of how a highway would appear looking through the windshield of a vehicle, if one were attempting to travel down the middle of the highway. As illustrated in FIG. 10b, a true perspective is provided in that the upcoming turn event at marker 2, is clearly shown, allowing the navigator to properly anticipate course changes. It is noted, however, that marker 3, as well as the way-point indicated by marker 5, have fallen outside the visible region 62, and thus are not shown on display 22.

Figure 10C:
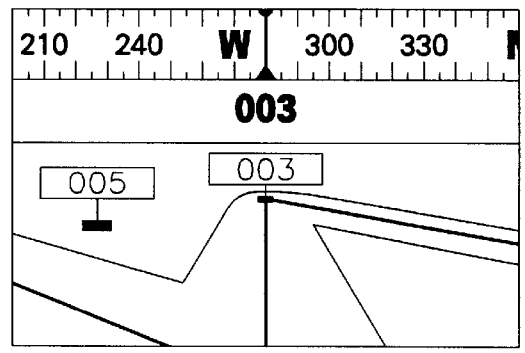

As illustrated in FIG. 10c, way-point 2 has been reached and the vessel has turned to the West toward marker 3. Again, the next turn event, indicated by marker 3, is clearly visible. Also, the leg of the route that the vessel just traversed is also visible, adding to the situational realism presented to the navigator. Additionally, the hazard, indicated by marker 5, has again come into view, as illustrated. Thus, as illustrated by FIG. 10a–10c, an important hazard, denoted by marker 5, is clearly visible anytime the vessel is heading in its direction, thus providing an important safety feature to the navigator. As also noted in FIG. 10c, the upcoming turn event at marker 3, to proceed down the final leg of the route to marker 4, is also illustrated.

As also illustrated in FIG. 10, in accordance with an aspect of the present invention, the middle line drawn down each lane, as indicated by step 78 of FIG. 9, is drawn in proper perspective so that the line appears to be closer to the rear edge of the lane, in true perspective form, for those lanes closer to the horizon. To highlight the desired course, each center line is preferably displayed in a color different from the lanes and background. Additionally, FIG. 10 clearly illustrates the manner in which the rounded ends of each lane overlap, thereby presenting a curved appearance as one lane intersects another.

In accordance with an aspect of the present invention, display 22 is periodically updated so that, as the vessel or craft moves along the navigational course, additional way-points or legs of an active route, that come into the visible region, are displayed. Preferably, the display is updated once each second, although other intervals could easily be selected. Additionally, in one preferred embodiment, when the vessel reaches a selected distance from a turn event, periodic updating of the display increases, to once each half second, or faster as desired, to enhance the realism presented by the display.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An electrical navigational device, for processing and displaying navigational data, said device comprising:

a processor;

a display, connected to said processor, for displaying a visual representation of said navigational data in a perspective view;

wherein said navigational data is indicative of a top-down view of a map;

wherein said processor transforms said navigational data to the said perspective view;

wherein said navigational data indicative of said top-down view of a map is defined by a matrix of (x,z) coordinates;

wherein said processor transforms each (x,z) coordinate to a corresponding perspective transformation coordinate $(x_p,y_p)$, and wherein said processor transforms each said (x,z) coordinate to its associated perspective transformation coordinate $(x_p,y_p)$ utilizing transformation equations:

$$x_p = \frac{x_d}{z}$$

$$y_p = \frac{h(z-d)}{z}$$

where d is indicative of a selected periphery of said perspective view and h is indicative of an elevation of said perspective view.

2. An electronic navigational device, for processing and displaying navigational data, said device comprising:

a processor;

a display, connected to said processor, for displaying a visual representation of said navigational data in a perspective view;

wherein said navigational data is indicative of a top-down view of a map;

wherein said processor transforms said navigational data to the said perspective view;

wherein said navigational data indicative of said top-down view of a map is defined by a matrix of (x,z) coordinates;

wherein said processor transforms each (x,z) coordinate to a corresponding perspective transformation coordinate $(x_p,y_p)$, wherein each said perspective transformation coordinate is translated in origin to a desired viewing plane corresponding to a display screen of said display; and wherein said processor transforms each (x,z) coordinate to its associated perspective transformation coordinate $(x_p,y_p)$, and simultaneously translates each perspective transformation coordinate to said desired viewing plane utilizing as transformation/translation equations:

$$x_p = \frac{x_t d}{z_t + d}$$

$$y_p = \frac{z_t h}{z_t + d}$$

where d is indicative of a selected periphery of said perspective view and h is indicative of an elevation of said perspective view.

* * * * *